US007668998B2

(12) United States Patent
Perisich et al.

(10) Patent No.: US 7,668,998 B2
(45) Date of Patent: Feb. 23, 2010

(54) METHODS, SYSTEMS, AND DEVICES FOR PROVIDING AN INTERRUPT SCHEME IN AUTOMATED PHARMACEUTICAL DISPENSING MACHINES WITHOUT CENTRALIZED ARBITRATION

(75) Inventors: Mark Perisich, Raleigh, NC (US); Mark Alan Uebel, Morrisville, NC (US)

(73) Assignee: Parata Systems, LLC, Durham, NC (US)

( * ) Notice: Subject to any disclaimer, the term of this patent is extended or adjusted under 35 U.S.C. 154(b) by 25 days.

(21) Appl. No.: 12/185,965

(22) Filed: Aug. 5, 2008

(65) Prior Publication Data
US 2009/0177827 A1 Jul. 9, 2009

Related U.S. Application Data

(60) Provisional application No. 61/019,683, filed on Jan. 8, 2008.

(51) Int. Cl.
*G06F 13/24* (2006.01)
*G07F 11/00* (2006.01)
(52) U.S. Cl. ............................. 710/262; 710/49; 211/10
(58) Field of Classification Search .................. 710/48, 710/49, 109, 117, 124, 260, 262; 211/9, 211/10, 13
See application file for complete search history.

(56) References Cited

U.S. PATENT DOCUMENTS 4,639,859 A    1/1987   Ott
4,654,820 A  * 3/1987   Brahm et al. ............... 710/260
5,327,121 A  * 7/1994   Antles, II .................... 710/110
5,475,846 A  * 12/1995  Moore ......................... 710/260
5,765,000 A  * 6/1998   Mitchell et al. ............. 710/266

(Continued)

OTHER PUBLICATIONS

Vallius et al., "Low Cost Arbitration Method for Arbitrarily Scalable Multiprocessor Systems", 4th IEEE International Symposium on Electronics Design, Test and Applications, pp. 119-124 (Jan. 23, 2008) XP031234463.

(Continued)

*Primary Examiner*—Khanh Dang
(74) *Attorney, Agent, or Firm*—Myers, Bigel, Sibley & Sajovec, P.A.

(57) ABSTRACT

In a method for communication between a master node and a plurality of slave nodes connected by a bus therebetween, a first interrupt request is asserted by one of the plurality of slave nodes via a primary interrupt line. The plurality of slave nodes are electrically connected by the primary interrupt line. A unique delay time for requesting an interrupt is associated with each of the plurality of slave nodes. A second interrupt request is asserted by the one of the plurality of slave nodes via a secondary interrupt line electrically connecting the plurality of slave nodes. The second interrupt request is asserted in response to successfully asserting the first interrupt request and after the unique delay time associated with the one of the plurality of slave nodes. A message is then transmitted from the one of the plurality of slave nodes to the master node via the bus. Related systems and devices are also discussed, including the use of the primary and secondary interrupt request lines to provide bus arbitration between the plurality of slave nodes for communication with the master node.

25 Claims, 6 Drawing Sheets

U.S. PATENT DOCUMENTS

| | | | |
|---|---|---|---|
| 5,787,258 A * | 7/1998 | Costa et al. | 709/251 |
| 6,006,946 A | 12/1999 | Williams et al. | |
| 6,036,812 A | 3/2000 | Williams et al. | |
| 6,128,691 A * | 10/2000 | Haren et al. | 710/260 |
| 6,141,703 A * | 10/2000 | Ding et al. | 710/10 |
| 6,176,392 B1 | 1/2001 | William et al. | |
| 6,263,395 B1 * | 7/2001 | Ferguson et al. | 710/262 |
| 6,708,241 B1 * | 3/2004 | Futral | 710/260 |
| 6,971,541 B2 | 12/2005 | Williams et al. | |
| 7,014,063 B2 | 3/2006 | Shows et al. | |
| 7,344,049 B2 | 3/2008 | Daniels et al. | |
| 2003/0149827 A1 * | 8/2003 | Smolen et al. | 710/315 |
| 2005/0268016 A1 * | 12/2005 | Mowry et al. | 710/260 |
| 2005/0283554 A1 * | 12/2005 | Davies et al. | 710/260 |
| 2006/0241807 A1 | 10/2006 | Daniels et al. | |
| 2007/0208820 A1 * | 9/2007 | Makhervaks et al. | 709/212 |
| 2008/0110555 A1 | 5/2008 | Bouchelle et al. | |
| 2008/0110921 A1 | 5/2008 | DuMond et al. | |
| 2008/0168751 A1 | 7/2008 | Sink et al. | |
| 2008/0169302 A1 | 7/2008 | Young et al. | |
| 2008/0283179 A1 | 11/2008 | Sink | |
| 2008/0283544 A1 | 11/2008 | Daniels et al. | |

OTHER PUBLICATIONS

International Search Report and Written Opinion (14 pages) corresponding to International Application No. PCT/US2008/014106; Mailing Date: May 28, 2009.

* cited by examiner

METHODS, SYSTEMS, AND DEVICES FOR PROVIDING AN INTERRUPT SCHEME IN AUTOMATED PHARMACEUTICAL DISPENSING MACHINES WITHOUT CENTRALIZED ARBITRATION

CROSS-REFERENCE TO RELATED APPLICATIONS

This application claims priority from U.S. Provisional Patent Application No. 61/019,683, filed Jan. 8, 2008 and entitled Interrupt Scheme for a Multi-Node RS-485 4-Wire Network, the disclosure of which is hereby incorporated herein in its entirety.

FIELD OF THE INVENTION

The present invention is generally directed to integrated circuit devices and systems that communicate using buses, and more specifically is directed to the use of such systems in the automated dispensing of pharmaceuticals.

BACKGROUND OF THE INVENTION

Pharmacy generally began with the compounding of medicines, which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate all or portions of the pharmacy environment. Different exemplary approaches are shown in U.S. Pat. Nos. 6,006,946; 6,036,812; 6,176,392, and 6,971,541 to Williams et al. and in U.S. Pat. No. 7,014,063 to Shows et al. Some conventional automated systems for dispensing pharmaceuticals use multiple dispensing bins. Each dispensing bin may include a hopper in which tablets are stored, and a dispensing channel fluidly connecting the hopper to a dispensing outlet. Forward and reverse air flows may be used to selectively convey the tablets through the dispensing channel in each of a dispensing direction (toward the outlet) and a reverse direction (toward the hopper). A counting sensor may be positioned proximate the outlet of the dispensing channel and may be used to detect tablets passing the sensor in order to maintain a count of the tablets dispensed. Such systems may also be configured to select an appropriate vial, label the vial, fill the vial with a desired quantity of a selected pharmaceutical tablet, apply a cap to the filled vial, and convey the labeled, filled, capped vial to an offloading station for retrieval.

Although conventional systems can provide some automated steps to pharmaceutical dispensing, certain of the operations may be improved. For example, in a system that includes a relatively large number of tablet or pill-containing bins (also referred to hereinafter as "cells") connected together via a parallel communication bus, it may be desirable for the system master controller to intermittently or periodically check the status of each cell in the system.

One conventional solution for checking cell status is by polling the cells and/or controllers associated therewith in a round-robin approach, asking each cell or controller in turn whether they have any new information and/or status to report. If a cell or controller has such information, a master controller can then request that cell or controller to transmit the information to the master controller. However, such round-robin polling may be both traffic-intensive and time-consuming. For instance, cells may often have no information to transmit to the master controller, and thus time may be wasted by repeatedly polling the cells. Also, for a system that includes a large number of cells (for example, 256 cells), the amount of time required to complete even one round-robin cycle may be considerable. This could cause significant issues in time-critical networks, where those cells that do have information to transmit must do so quickly. For instance, a cell may wish to report that a tablet stored in the cell has jammed a chute for dispensing the tablet into a vial; however, if that cell has recently been polled in a conventional round-robin system, it may have to wait for up to 255 of the other cells to report their status before it is able to report the jam.

SUMMARY OF THE INVENTION

According to some embodiments of the present invention, a method for communication between a master node and a plurality of slave nodes connected by a bus therebetween includes: asserting, by one of the plurality of slave nodes, a first interrupt request via a primary interrupt line electrically connecting the plurality of slave nodes, wherein each of the plurality of slave nodes has a unique delay time associated therewith for requesting an interrupt; asserting, by the one of the plurality of slave nodes, a second interrupt request via a secondary interrupt line electrically connecting the plurality of slave nodes in response to successfully asserting the first interrupt request and after the unique delay time associated with the one of the plurality of slave nodes; and then transmitting a message from the one of the plurality of slave nodes to the master node via the bus.

According to other embodiments of the present invention, a system for bus communication without centralized arbitration includes: a master node; a plurality of slave nodes respectively associated with unique delay times for requesting an interrupt; a bus electrically connecting the master node to the plurality of slave nodes and configured to provide communication therebetween; a primary interrupt line electrically connecting the plurality of slave nodes; and a secondary interrupt line electrically connecting the plurality of slave nodes. One of the plurality of slave nodes is configured to assert a first interrupt request via the primary interrupt line, assert a second interrupt request via the secondary interrupt line in response to successful assertion of the first interrupt request and after the unique delay time associated therewith, and then transmit a message to the master node via the bus.

According to further embodiments of the present invention, an automated pill dispensing system, includes: a plurality of bins configured to dispense pills; a plurality of controller boards, wherein each controller board is configured to be coupled to at least one of the plurality of bins and is associated with a unique delay time for requesting an interrupt; a master controller configured to communicate with the plurality of controller boards; a system bus electrically connecting the master node to the plurality of controller boards and configured to provide communication therebetween; a primary interrupt line electrically connecting the plurality of controller boards; and a secondary interrupt line electrically connecting the plurality of controller boards. One of the plurality of controller boards is configured to assert a first interrupt request via the primary interrupt line, assert a second interrupt request via the secondary interrupt line in response to successful assertion of the first interrupt request and after the unique delay time associated therewith, and then transmit a message to the master controller via the system bus.

According to still further embodiments of the present invention, a controller board for communication with a master device via a bus shared with at least one other controller board includes: a microprocessor configured to assert a first interrupt request via a primary interrupt line electrically connecting the controller board to the at least one other controller board and configured to assert a second interrupt request via a secondary interrupt line electrically connecting the controller board to the at least one other controller board in response to successful assertion of the first interrupt request and after a unique delay time associated therewith for requesting an interrupt; and a bus translator coupled to the microprocessor and configured to transmit a message therefrom to the master device via the shared bus after successful assertion of both the first and second interrupt requests by the microprocessor.

Although described above primarily with respect to method, system, and device aspects of the present invention, it will be understood that the present invention may also be embodied as computer program products.

DETAILED DESCRIPTION OF EMBODIMENTS OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first controller board or slave node could be termed a second controller board or slave node, and, similarly, a second controller board or slave node could be termed a first controller board or slave node without departing from the teachings of the disclosure.

As will be appreciated by one of skill in the art, the present invention may be embodied as methods, devices, and/or computer program products. Accordingly, the present invention may be embodied in hardware and/or in software (including firmware, resident software, micro-code, etc.). Computer program code for carrying out operations of devices and/or systems discussed herein may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. The program code may execute entirely on a single processor and/or across multiple processors, as a stand-alone software package or as part of another software package. The program code may execute entirely on an electronic device or only partly on the electronic device and partly on another device. In the latter scenario, the other device may be connected to the electronic device through a wired and/or wireless local area network (LAN) and/or wide area network (WAN), or the connection may be made to an external computer (for example, through the Internet using an Internet Service Provider).

Well-known functions or constructions may not be described in detail for brevity and/or clarity.

Some embodiments of the present invention may arise from realization that, in an automated pill dispensing system and/or other systems that include a master device that controls operation of slave devices using bus communication, it may be advantageous to use an interrupt system in which a slave could assert an interrupt when it had information to report, and the master could then service that interrupt immediately and obtain the information. Accordingly, some embodiments of the present invention provide an interrupt scheme including a primary interrupt line and a secondary interrupt line, where a slave device gains control of both lines to assert an interrupt to the master device. Each of the slave devices is associated with a unique delay time for asserting the secondary interrupt line after asserting the primary interrupt line.

The delay time for each slave device is different from those of the other slave devices, and may be selected such that, even if two or more slave devices assert the primary interrupt line at the same time, only one of these slave devices will assert the secondary interrupt line. With this implemented, the master device may no longer have to use round-robin polling to check the status of the slave devices. Rather, the master device may sit idle, and may monitor both of the interrupt lines to determine if any of the slave devices requires servicing.

Figure 1:
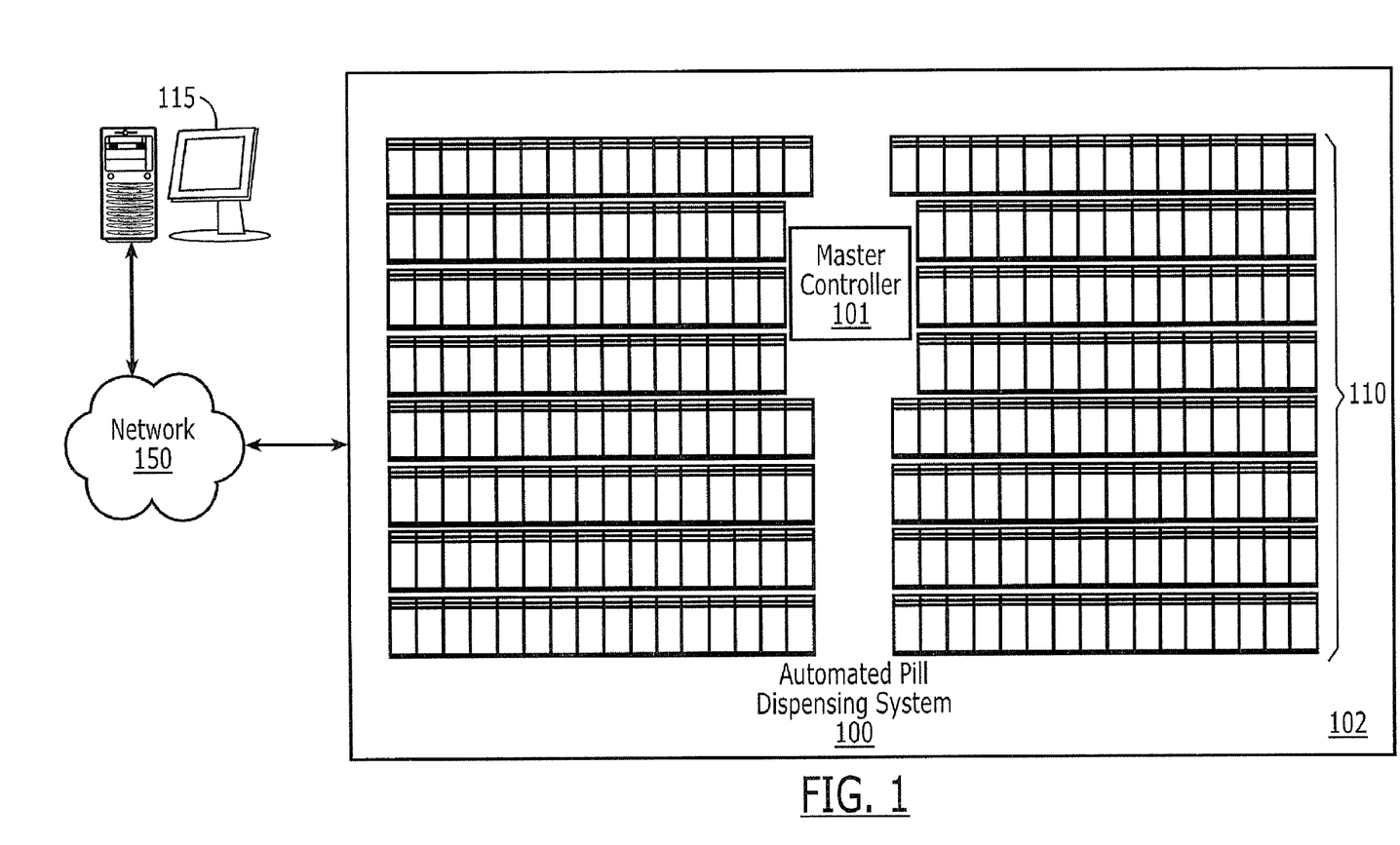
FIG. 1 is a block diagram depicting an automated pill dispensing system configured for bus communication without centralized arbitration in accordance with some embodiments of the present invention.

An automated pill dispensing system according to some embodiments of the present invention that can carry out the foregoing interrupt scheme is illustrated in FIG. 1 and is designated broadly therein at 100. Referring now to FIG. 1, the system 100 includes a master controller 101, a plurality of pill-containing bins or "cells" 110, and a support frame 102 in which the master controller 101, the bins 110, and/or other components are mounted. Each bin 110 may contain pills or tablets of a particular type and/or size, and may include a mechanism for singulating, counting, and dispensing the pills contained therein. Such mechanisms are further described, for example, in U.S. patent application Ser. Nos. 11/599,526; Ser. No. 11/599,576; Ser. No. 11/679,850; Ser. No. 11/693,929; Ser. No. 11/755,249; Ser. No. 11/927,865; and Ser. No. 11/111,270, the disclosure of each of which is incorporated by reference herein in its entirety.

The operations of the bins 110, including counting and dispensing of the tablets, are controlled by the master controller 101 and/or one or more controller boards (as illustrated in detail in FIG. 2) associated with the bins 110. As shown in FIG. 1, the master controller 101 is represented by a graphical user interface monitor integrated into the support frame 102 of the automated pill dispensing system 100. In some embodiments, the master controller 101 may be operatively connected with an external device, such as a personal or mainframe computer 115, that provides input information regarding prescriptions and/or other control information. In other embodiments, the master controller 101 may be implemented entirely in a stand-alone computer 115 that directly receives manual input from a pharmacist or other operator and communicates with the bins 110 via a network 150. The network 150 may represent a global network, such as the Internet; however, the network 150 may also represent a wide area network, a local area network, an Intranet, or other private network, which may not be accessible by the general public. As such, the master controller 101 may be remote from the bins 110 in some embodiments. In other words, although illustrated as such in FIG. 1, the master controller need not be mounted in the support frame 102. More generally, although FIG. 1 illustrates the functionality of an automated pill dispensing system 100 according to some embodiments of the present invention with reference to particular components or blocks, the functionality of particular blocks may be combined, divided, and/or eliminated.

Figure 2:
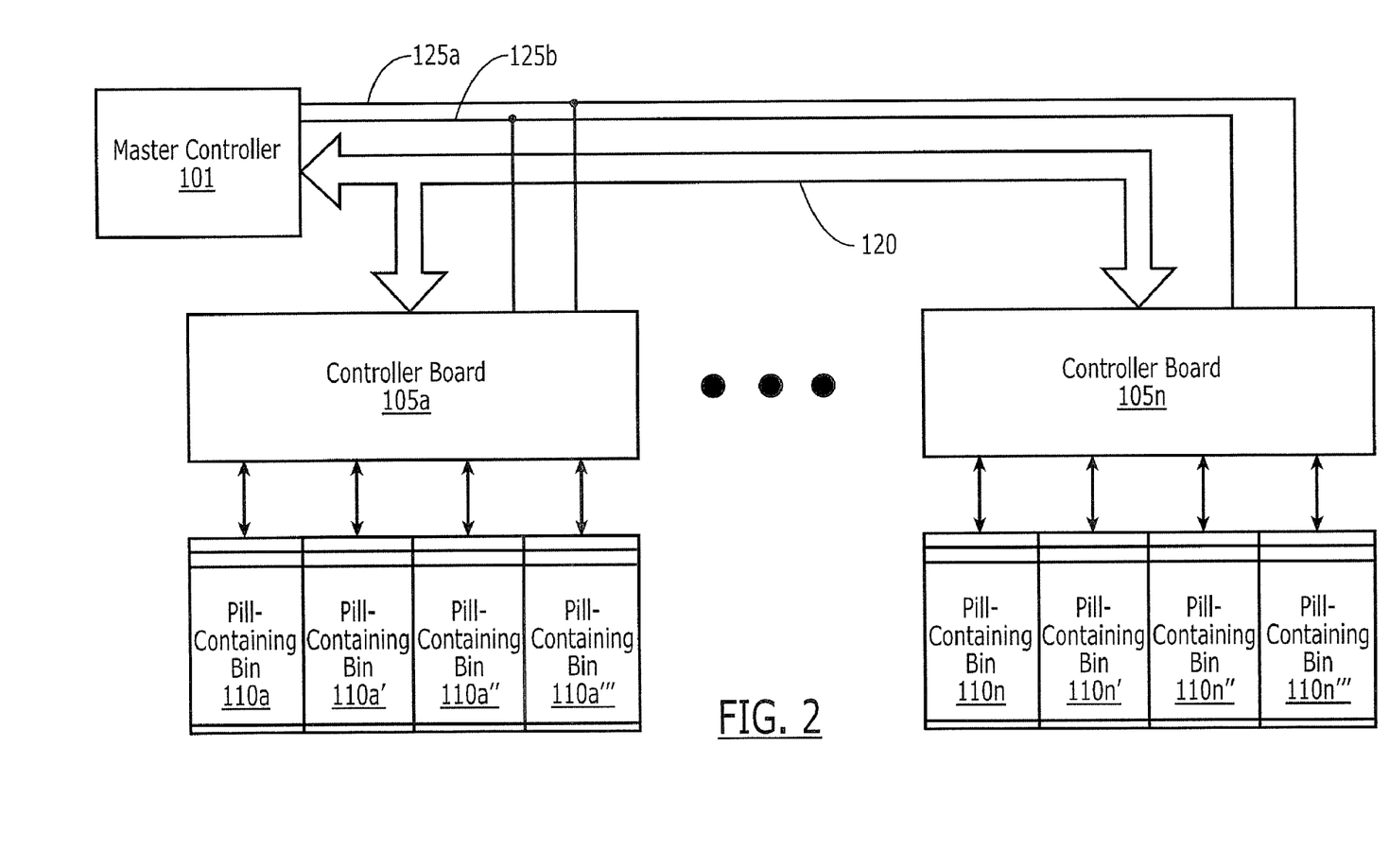
FIG. 2 is schematic diagram illustrating a system for bus communication without centralized arbitration between the master controller and the pill-containing bins of FIG. 1 in accordance with some embodiments of the present invention.

FIG. 2 illustrates a system for bus communication without centralized arbitration between the master controller and the pill-containing bins of FIG. 1 in accordance with some embodiments of the present invention. Referring now to FIG. 2, a plurality of controller boards 105a-105n provide communication between the pill-containing bins or cells 110 and the master controller 101 via a bus 120. The controller boards 105a-105n may each include one or more microprocessors and related circuitry to support communication between one or more of the bins 110 and the master controller 101 using the bus 120. As shown in FIG. 2, the controller boards 105a-105n each support communication between the master controller 101 and four bins. For example, controller board 105a handles communication with the master controller 101 for bins 110a, 110a', 110a'', and 110a''', while the controller board 105n handles communication with the master controller 101 for bins 110n, 110n', 110n'', and 110n'''. However, it is to be understood that the controller boards 105a-105n may each support communications for additional bins or fewer bins in other embodiments.

Accordingly, the master controller 101 may transmit commands to the controller boards 105a-105n via the bus 120 to control operation of the bins 110a-110n''', and the controller boards 105a-105n may provide respective replies (typically indicating success or failure with respect to the transmitted command) for the bins 110a-110n''' to the master controller 101 via the bus 120. For example, the master controller 101 may transmit a presence request to all of the controller boards 105a-105n via the bus 120 to determine a presence thereof, and each of the controller boards 105a-105n may transmit a response message indicating its respective address and/or the identities of the bins associated therewith to the master controller 101 via the bus 120. In addition, the master controller 101 may transmit a command via the bus 120 instructing the controller board 105a to dispense a particular number of pills from bin 110a', and the controller board 105a may transmit a reply to the master controller 101 indicating that the requested number of pills have been dispensed, or conversely, that there was a failure to dispense the requested number of pills. In some embodiments, the master controller 101 may infer that the bin 110a' is jammed in response to receiving such a failure message from the controller board 105a. Other messages that may be transmitted from the controller boards 105a-105n to the master controller 101 via the bus 120 may include a pill count successful message, a pill count failure message, a pill supply error message, a pill agitator error message, and/or a controller board processor failure message.

Still referring to FIG. 2, as noted above, a contention problem may arise in a situation where more than one of the controller boards 105a-105n attempts to respond and/or request service from the master controller 101 via the bus 120 at the same time. Accordingly, as shown in FIG. 2, an interrupt scheme including a primary interrupt line 125a and a secondary interrupt line 125b is provided. More particularly, each of the controller boards 105a-105n is connected to the master controller 101 by both the primary interrupt line 125a and the secondary interrupt line 125b. To assert an interrupt to the master controller 101, one of the controller boards 105a-105n gains control of both the primary and the secondary interrupt lines 125a and 125b. Accordingly, to prevent contention, each of the controller boards 105a-105n is associated with a unique delay time for requesting an interrupt via the secondary interrupt line 125b. In other words, each of the controller boards 105a-105n is configured to wait or delay a different amount of time between asserting the primary interrupt line 125a and asserting the secondary interrupt line 125b. As such, even if two or more of the controller boards 105a-105n assert the primary interrupt line 125a at the same time, none may assert the secondary interrupt line 125b at the same time.

For example, the unique delay time for each controller board 105a-105n may be selected based on the address of the controller board on the bus 120. In some embodiments, the unique delay time for each controller board 105a-105n may be a multiple of the controller board's address. Thus, if the controller board 105a has an address of one, it would wait 1 microsecond (µs) or so between asserting the primary interrupt line 125a and asserting the secondary interrupt line 125b. Likewise, if the controller board 105n has an address of six, it would wait 6 µs to assert the secondary interrupt line 125b after asserting the primary interrupt line 125a. Since each of the controller boards 105a-105n has a different address, each will wait a different delay time before asserting the secondary interrupt line 125*b*; thus, no two of the controller boards 105*a*-105*n* will attempt to assert the secondary interrupt line 125*b* at the same time.

However, it is to be understood that the unique delay times need not be based on the different addresses of the controller boards 105*a*-105*n*. For instance, in other embodiments, a lookup table associating each of the controller boards 105*a*-105*n* with a unique delay time may be stored in and/or otherwise accessible to the controller boards 105*a*-105*n*. As such, each of the controller boards 105*a*-105*n* may access the lookup table to determine when to assert the secondary interrupt line 125*b*. In still other embodiments, a software timing routine may be used to associate each of the controller boards 105*a*-105*n* with a unique delay time.

Accordingly, when one of the bins 110*a*-110*a*''' coupled to controller board 105*a* requires service, the controller board may interrogate the primary interrupt line 125*a* to determine whether it is available, and if so, may assert a first interrupt request via the primary interrupt line 125*a*. After waiting the unique delay time, the controller board 105*a* may interrogate the secondary interrupt line 125*b* to determine whether it is available, and if so, may assert a second interrupt request via the secondary interrupt line 125*b*. Upon gaining control of both the primary interrupt line 125*a* and the secondary interrupt line 125*b*, the controller board 105*a* may transmit its message to the master controller 101 via the system bus 120. However, if the controller board 105*a* determines that the secondary interrupt line 125*b* is not available, the controller board 105*a* releases the primary interrupt line 125*a*, and may attempt the above process again. Thus, the controller boards 105*a*-105*n* and the master controller 101 of the automated pill dispensing system 100 may communicate via the bus 120 without contention.

Figure 3A:
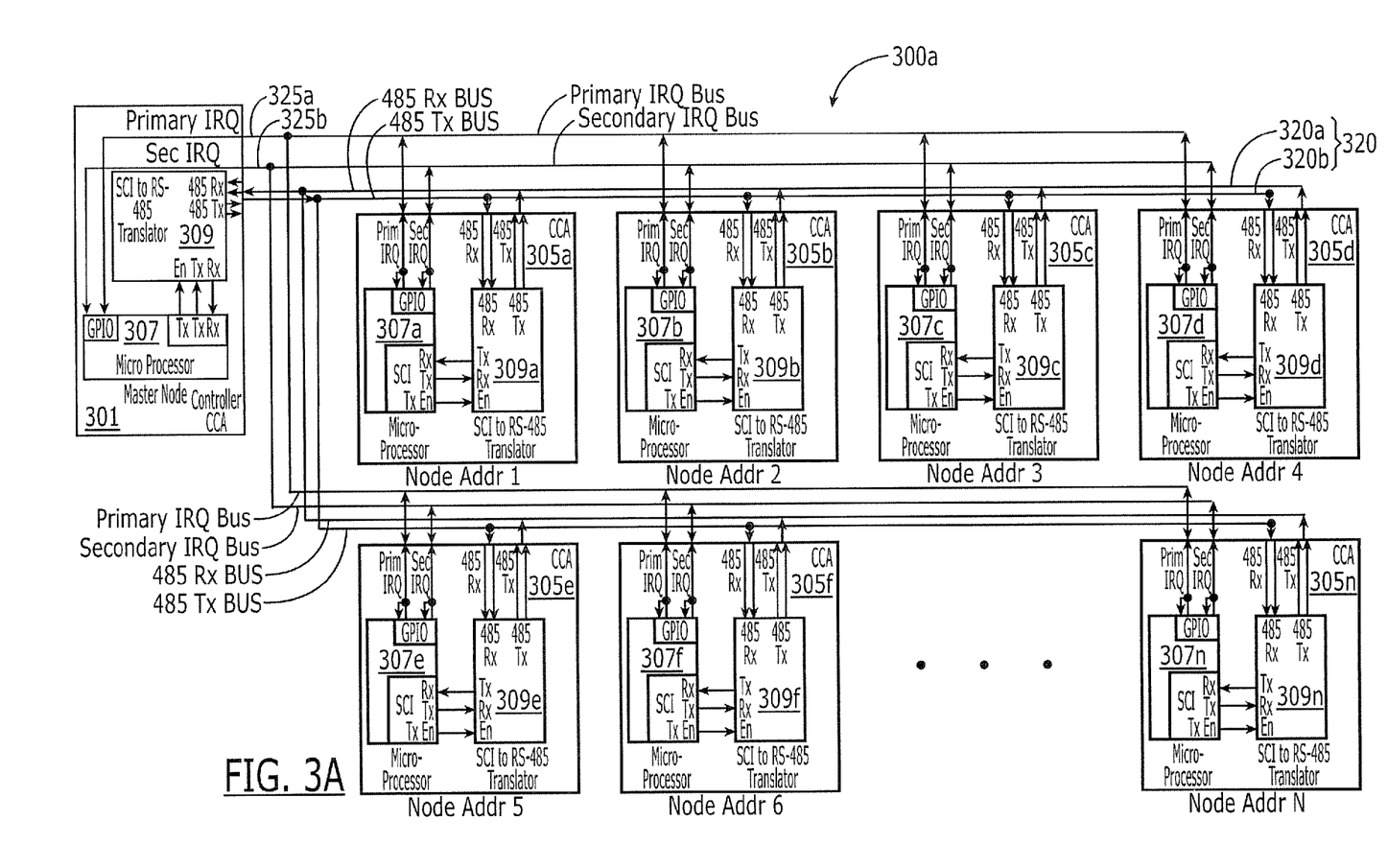
FIG. 3A is schematic diagram illustrating a system for bus communication between a master node and a plurality of slave nodes without centralized arbitration such that any of the plurality of slave nodes may generate a unique interrupt back to the master controller in accordance with some embodiments of the present invention.

FIG. 3A illustrates a system for bus communication without centralized arbitration between a master node and a plurality of slave nodes in accordance with some embodiments of the present invention. Referring now to FIG. 3A, the system 300*a* includes a master node 301 that is configured to communicate with slave nodes 305*a*-305*n* via a bus 320 including receive and transmit lines 320*a* and 320*b*. As such, the master node 301 includes a microprocessor 307 configured to control operations of the system 300*a*, and a bus translator 309 configured to provide communication between the microprocessor 307 and the bus 320. Similarly, the slave nodes 305*a*-305*n* may respectively include microprocessors 307*a*-307*n* and bus translators 309*a*-309*n*. In some embodiments, the master node 301 may correspond to the master controller 101 of FIG. 2, and the slave nodes 305*a*-305*n* may correspond to the controller boards 105*a*-105*n* of FIG. 2. Likewise, in some embodiments, the bus 320 may correspond to the bus 120 of FIG. 2.

In some embodiments, the bus 320 may be provided according to the RS-485 standard. RS-485 is an established standard for a 4-wire network, which may be used to provide reliable communication between the master node 301 and the slave nodes 305*a*-305*n*. For example, the microprocessor 307 of the master node 301 may include a general-purpose input/output (GPIO) interface 311 and a serial communication interface (SCI) 313, and the bus translator 309 may be a SCI to RS-485 translator. The slave nodes 305*a*-305*n* may similarly include GPIO interfaces 311*a*-311*n*, SCIs 313*a*-313*n*, and SCI to RS-485 translators 309*a*-309*n*. The number of slave nodes 305*a*-305*n* may be limited by the input impedance of the transceivers on the bus 320, but up to 256 slave nodes may be supported using relatively high-impedance transceivers. Each of the slave nodes 305*a*-305*n* has a unique address on the bus 320, so that each slave node 305*a*-305*n* can be identified by the master node 301.

However, an inherent limitation with the RS-485 standard is that it does not provide built-in arbitration. As noted above, the master node 301 transmits commands to all of the slave nodes 305*a*-305*n*, and all of the slave nodes 305*a*-305*n* transmit information back to the master node 301 via the same bus 320. As such, a contention problem may arise when two or more of the slave nodes 305*a*-305*n* attempt to transmit information back to the master node 301 via the bus 320 at the same time, which may result in a garbled message.

Accordingly, as shown in FIG. 3A, the system 300*a* further includes a primary IRQ line 325*a* and secondary IRQ line 325*b* electrically connecting the master node 301 to each of the slave nodes 305*a*-305*n*. More particularly, the processors 307*a*-307*n* of each of the slave nodes 305*a*-305*n* is connected to the master microprocessor 307 via the primary and secondary IRQ lines 325*a* and 325*b*. The master node 301 monitors both the primary and secondary IRQ lines 325*a* and 325*b* to look for an interrupt request from one of the slave nodes 305*a*-305*n*. However, a slave node must gain control of both the primary and secondary IRQ lines 325*a* and 325*b* to assert an interrupt to the master node 301. A such, each of the slave nodes 305*a*-305*n* is associated with a unique delay time for requesting an interrupt via the secondary IRQ line 325*b* after requesting an interrupt via the primary IRQ line 325*a*. In other words, each of the slave nodes 305*a*-305*n* is configured to wait or delay a different amount of time between asserting the primary IRQ line 325*a* and asserting the secondary IRQ line 325*b*. As noted above with reference to FIG. 2, the unique delay time for each of the slave nodes 305*a*-305*n* may be based on the address of each slave node on the bus 320 in some embodiments. However, in other embodiments, the unique delay time for each of the slave nodes 305*a*-305*n* may be determined by other methods, for example, from a lookup table and/or software timing routine. As such, even if two or more of the slave nodes 305*a*-305*n* assert the primary IRQ line 325*a* at the same time, none may assert the secondary IRQ line 325*b* at the same time.

For example, when slave node 305*a* requires service, it interrogates the primary IRQ line 325*a* to determine whether it is free. If so, slave node 305*a* asserts a first interrupt request to the master node 301 via the primary IRQ line 325*a*. However, it is possible that another slave node, such as slave node 305*n*, could also interrogate the primary IRQ line 325*a* and assert a first interrupt request via the primary IRQ line 325*a* at the same time. In other words, two or more of the slave nodes 305*a*-305*n* may gain control of the primary IRQ line 325*a* at the same time. Accordingly, the slave nodes 305*a* and 305*n* are configured to wait or delay by different amounts of time before interrogating and/or asserting the secondary IRQ line 325*b*. For instance, slave node 305*a* may have an address of one, and thus, waits 1 microsecond (as) or so after asserting the primary IRQ line 325*a* to assert the secondary IRQ line 325*b*. Similarly, slave node 305*n* may have an address of six, and waits 6 μs to assert the secondary IRQ line 325*b*. More generally, a node with an address of n may be associated with a delay of n microseconds in some embodiments.

After waiting the respective delay times, the slave nodes 305*a* and 305*n* respectively interrogate the secondary IRQ line 325*b* to see if it is available. In particular, based on the above example, the slave node 305*a* interrogates the secondary IRQ line 325*b* 1 μs after asserting the primary IRQ line 325*a*, and finds the line 325*b* available. If so, the slave node 305*a* asserts a second interrupt request via the secondary IRQ line 325*b*. The slave node 305*n* similarly interrogates the secondary IRQ line 325*b* 6 μs after asserting the primary IRQ line 325*a*, but finds that it is currently asserted by the slave node 305*a*. As such, the slave node 305*n* releases the primary IRQ line 325*a*, and may attempt the interrupt process again. Accordingly, since each of the slave nodes 305*a*-305*n* in the above example has a different address on the bus 320, their delays for asserting the secondary IRQ line 325*b* will be different times; thus no two nodes will assert the secondary IRQ line 325*b* at the same time. In other words, only one of the slave nodes 305*a*-305*n* can gain control of both the primary and secondary IRQ lines 325*a* and 325*b*.

The master node 301 monitors both the primary and secondary IRQ lines 325*a* and 325*b*, and determines that one of the slave nodes 305*a*-305*n* is requesting service when it detects that both the primary and secondary IRQ lines 325*a* and 325*b* asserted. As such, the master node 301 transmits a global query to all of the slave nodes 305*a*-305*n* via the bus 320 to ask which of the nodes 305*a*-305*n* needs servicing. The slave node 305*a* receives the query from the master node 301, and in response, transmits its message requesting service via the bus 320. As the slave node 305*a* is the only node that currently controls both the primary and secondary IRQ lines 325*a* and 325*b*, only the slave node 305*a* transmits a message in response to the query. Accordingly, some embodiments of the present invention provide a hardware-based interrupt scheme that does not require arbitration.

Thus, interrupt schemes in accordance with some embodiments of the present invention as illustrated in FIG. 3A may be used in a "pull the chain"-type system, where any of the slave nodes 305*a*-305*n* may request service at any time by asserting both of the IRQ lines 325*a* and 325*b*. For example, if successful in asserting both of the IRQ lines 325*a* and 325*b*, the slave node 305*a* may receive a message from the master node 301 to service its request. If the IRQ lines 325*a* and 325*b* are unavailable and/or in use by another slave node, the slave node 305*a* may try again, and would eventually succeed. Service may be requested by the slave nodes 305*a*-305*n* for a number of reasons. For instance, the slave node 305*a* may have failed a built-in-test, and may need to inform the master node 301 that there was a problem. In addition, the slave node 305*a* may have received a command to perform a particular task, and may need to provide confirmation to the master node 301 that the task was completed in response to the command.

Figure 3B:
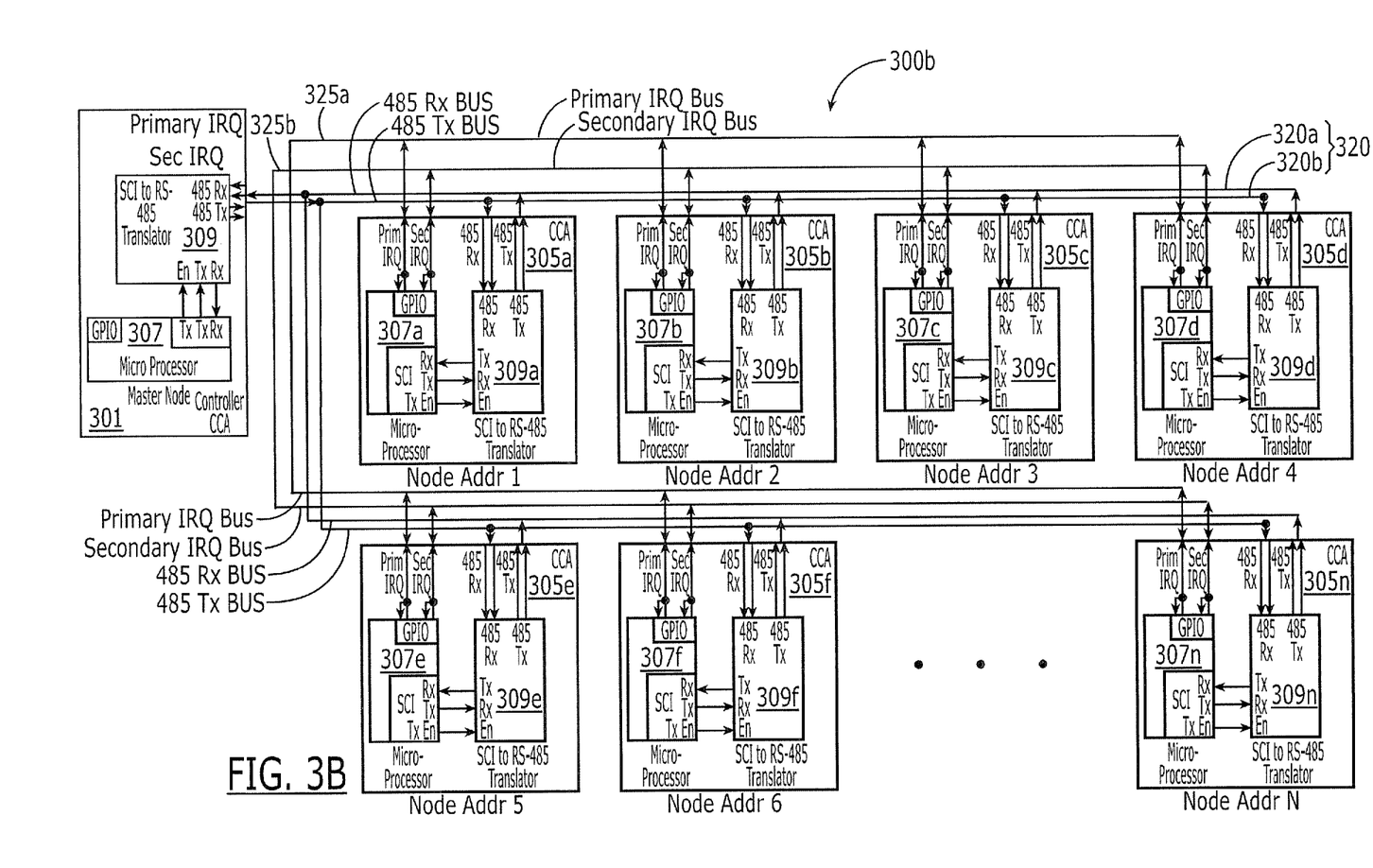
FIG. 3B is schematic diagram illustrating a system for bus communication between a master controller and a plurality of slave nodes to provide decentralized bus arbitration in accordance with other embodiments of the present invention.

Interrupt schemes in accordance with other embodiments of the present invention may be used in any multi-node system to provide for communication between slave nodes and a master node using a shared bus. For example, FIG. 3B illustrates a system 300*b* that provides decentralized bus arbitration for communication between a master node 301 and a plurality of slave nodes 305*a*-305*n*. As shown in FIG. 3B, the primary and secondary IRQ lines 325*a* and 325*b* connect the processors 307*a*-307*n* of each of the slave nodes 305*a*-305*n*, but are not connected to the master node 301. The system 300*b* _is provisioned such that none of the slave nodes 305*a*-305*n* are allowed to transmit messages on the bus 320 unless a slave node has asserted both the primary and secondary IRQ lines 325*a* and 325*b*. Accordingly, the slave nodes 305*a*-305*n* can transmit respective messages on the bus 320 without fear that another slave node is transmitting on the bus 320 at the same time. As such, when a slave node requires service, the slave node does not have to wait for the master node 301 to transmit a query; rather, the slave node may independently gain control of both the primary and secondary IRQ lines 325*a* and 325*b*, and if successful, may transmit its message upstream to the master node 301 via the bus 320. The master node 301 may be idle, and may receive messages as necessary from the slave nodes without periodic and/or intermittent polling. Accordingly, some embodiments of the present invention allow for unilateral transmission of information from slave nodes on a shared bus without centralized arbitration (i.e., by a master node and/or other controller) and without fear of contention with other slave nodes. Also, although described in FIGS. 3A and 3B with reference to a RS-485 4-wire network, embodiments of the present invention may be used in any network where a bus is shared by multiple nodes without built-in arbitration.

Figure 4:
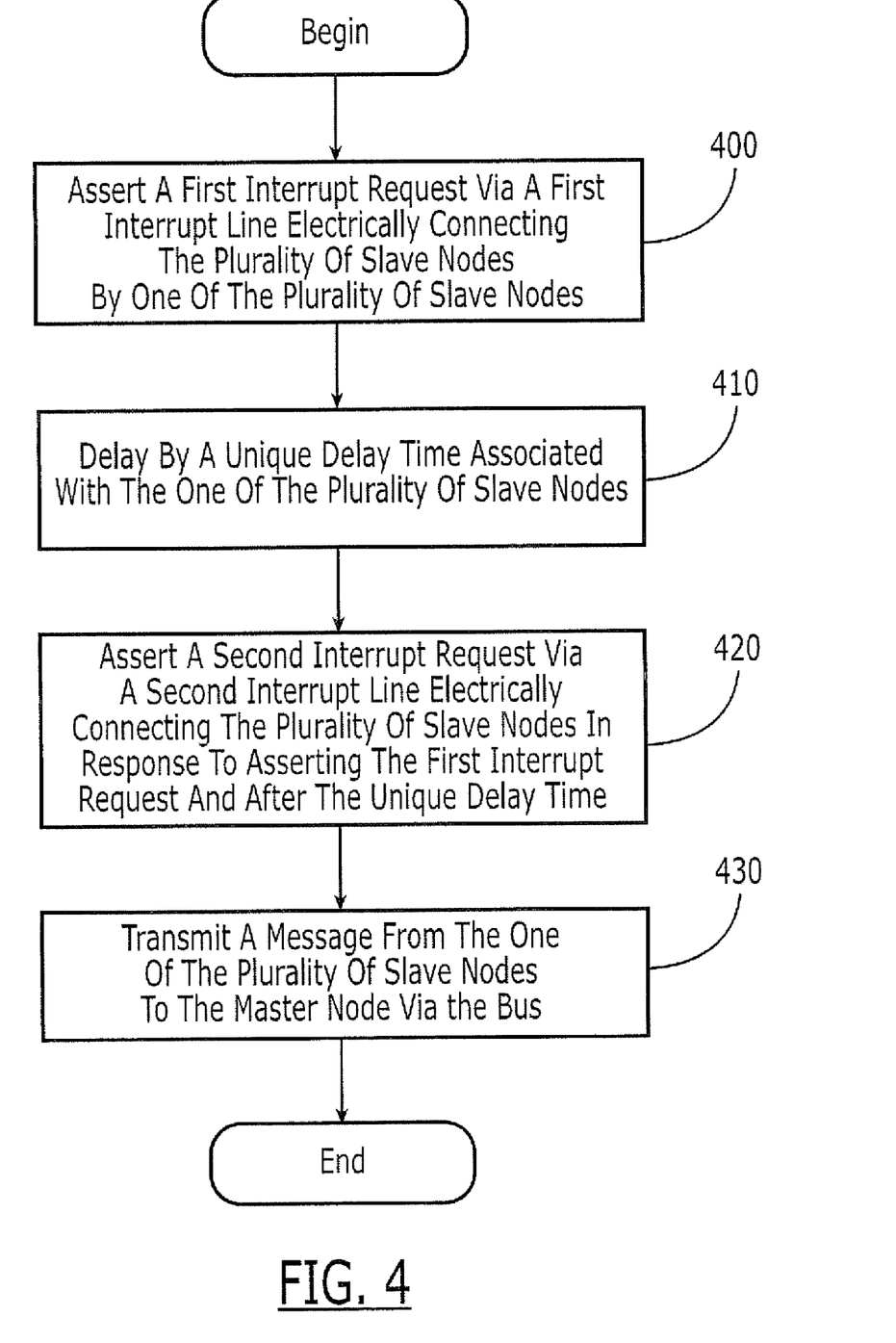
FIGS. 4 and 5 are flowcharts illustrating example operations for bus communication without centralized arbitration in accordance with some embodiments of the present invention.

FIG. 4 is a flowchart illustrating example operations for providing communication between a master node and a plurality of slave nodes using a shared bus without centralized arbitration in accordance with some embodiments of the present invention. In some embodiments, the operations of FIG. 4 may be carried out by one of the slave nodes 305*a*-305*n* of the systems 300*a*-300*b* of FIGS. 3A-3B. Referring now to FIG. 4, a first interrupt request is asserted by one of the slave nodes via a primary interrupt line (Block 400). The primary interrupt line electrically connects all of the slave nodes. The master node may be configured to receive information and/or service requests from the slave nodes via the bus. After asserting the first interrupt request, the slave node waits or delays by a unique delay time associated with the slave node (Block 410). For example, each slave node may be associated with a unique delay time for asserting a second interrupt request after asserting the first interrupt request. In some embodiments, the unique delay time may be based on an address of the slave node on the bus. For instance, the unique delay time may be a multiple of the slave node's address. In other embodiments, the unique delay time for each slave node may be determined from a lookup table and/or software timing routine. As such, a different delay time is associated with each of the slave nodes in the system.

Still referring to FIG. 4, after the unique delay time, a second interrupt request is asserted by the slave node via a secondary interrupt line (Block 420). The secondary interrupt line also electrically connects all of the slave nodes, and is separate from the primary interrupt line. The second interrupt request is asserted in response to successful assertion of the first interrupt request, but after the unique delay time. As each slave node is associated with a different unique delay time for asserting the second interrupt request after asserting the first interrupt request, no two slave nodes will assert the second interrupt request via the secondary interrupt line at the same time. In response to successful assertion of both the first and second interrupt requests, a message is transmitted from the slave node to the master node via the bus (Block 430). In some embodiments, the primary and secondary interrupt lines may also be connected to the master node, and the message may be transmitted in response to receiving a query from the master node after asserting the first and second interrupt requests. In other embodiments, the primary and secondary interrupt lines may not be connected to the master node, and the message may be transmitted independently alter asserting both the first and second interrupt requests. Accordingly, any slave node may request service at any time via the bus without arbitration by gaining control of both the primary and secondary interrupt lines.

Figure 5:
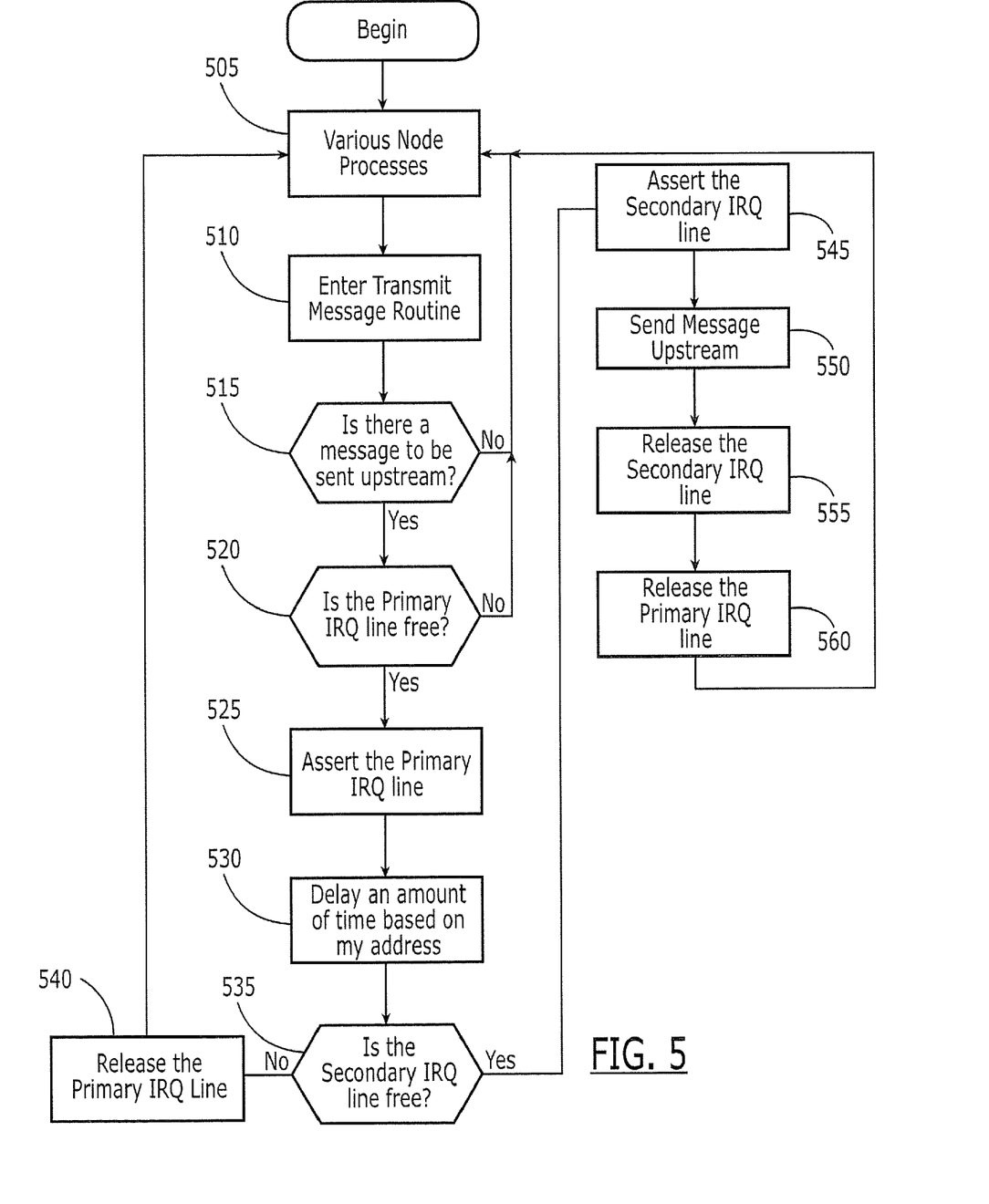

FIG. 5 is a flowchart illustrating example operations for providing communication between a master controller and controller boards using a shared bus without centralized arbitration in an automated pill dispensing system in accordance with other embodiments of the present invention. In some embodiments, the operations of FIG. 5 may be carried out by one of the controller boards 105*a*-105*n* of the system 100 of FIGS. 1-2. Referring now to FIG. 5, various processes associated with automated pill dispensing are performed by a controller board in an automated pill dispensing system (Block 505). A transmit message routine is entered (Block 510), and it is determined whether any messages and/or service requests are to be sent upstream to a master controller via the bus (Block 515). For example, the transmit message routine may be entered in response to receiving a command from the master controller via the bus and/or when one or more of the pill-dispensing bins coupled to the controller board independently indicates that it requires service. If it is determined that no messages are to be sent upstream, the various processes continue (Block 505).

On the other hand, if it is determined that there is a message to be sent to the master controller, it is determined whether a primary interrupt line is available (Block 520). If the primary interrupt line is not available, the various processes continue (Block 505). If the primary interrupt line is determined to be available (Block 520), a first interrupt request is asserted via the primary interrupt line (Block 525), and a subsequent interrupt request is delayed by a unique delay time associated with the controller board (Block 530). As noted above, in some embodiments, the unique delay time may be a function of and/or a multiple of the address of the controller board.

After the unique delay time, it is determined whether the secondary interrupt line is available (Block 535). If the secondary interrupt line is not available, the primary interrupt line is released (Block 540), and the various processes continue (Block 505). However, if it is determined that the secondary interrupt line is available (Block 535), a second interrupt request is asserted via the secondary interrupt line (Block 545). The unique delay time for each controller board ensures that no two controller boards will assert the second interrupt request at the same time. Once both the primary interrupt line and the secondary interrupt line are asserted (Blocks 525 and 545), the message is transmitted upstream to the master controller via the bus (Block 550). For example, the message may be transmitted to indicate a pill count failure at a bin associated with the controller board. In some embodiments, the message may be transmitted via the bus in response to receiving a command from the master node, while in other embodiments, the message may be transmitted independently after asserting both the first and second interrupt requests. After transmitting the message, the secondary interrupt line is released (Block 555), the primary interrupt line is released (Block 560), and the various processes continue (Block 505).

The flowcharts of FIGS. 4 and 5 illustrate the architecture, functionality, and operations of embodiments of hardware and/or software for bus communication without centralized arbitration according to various embodiments of the present invention. It will be understood that each block of the flowchart and/or block diagram illustrations, and combinations of blocks in the flowchart and/or block diagram illustrations, may be implemented by computer program instructions and/or hardware operations. In this regard, each block represents a module, segment, or portion of code, which comprises one or more executable instructions for implementing the specified logical function(s).

It should be noted that, in other implementations, the function(s) noted in the blocks may occur out of the order noted in FIGS. 4 and 5. For example, two blocks shown in succession may, in fact, be executed substantially concurrently, or the blocks may sometimes be executed in the reverse order, depending on the functionality involved. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular maimer, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Accordingly, some embodiments of the present invention provide an interrupt scheme for communication between a master node and a plurality of slave nodes via a shared bus without the use of centralized arbitration. In particular, first and second interrupt lines are provided, both of which must be asserted for a slave device to communicate on the bus. Each of the slave nodes is associated with a unique delay time for asserting the second interrupt line. The unique delay times may be selected for each node such that, even if two or more nodes assert the first interrupt line at the same time, no two nodes will assert the second interrupt line at the same time.

The foregoing is illustrative of the present invention and is not to be construed as limiting thereof. Although a few exemplary embodiments of this invention has been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A method for communication between a master node and a plurality of slave nodes connected by a bus therebetween, the method comprising:
    asserting, by one of the plurality of slave nodes, a first interrupt request via a primary interrupt line electrically connecting the plurality of slave nodes, wherein each of the plurality of slave nodes has a unique delay time associated therewith for requesting an interrupt;
    asserting, by the one of the plurality of slave nodes, a second interrupt request via a secondary interrupt line electrically connecting the plurality of slave nodes in response to successfully asserting the first interrupt request and after the unique delay time associated with the one of the plurality of slave nodes; and then
    transmitting a message from the one of the plurality of slave nodes to the master node via the bus.

2. The method of claim 1, further comprising:
    determining, by the one of the plurality of slave nodes, an availability of the primary interrupt line, wherein asserting the first interrupt request comprises asserting the first interrupt request in response to determining that the primary interrupt line is available; and determining, by the one of the plurality of slave nodes, an availability of the secondary interrupt line in response to successfully asserting the first interrupt request and at the unique delay time thereafter, wherein asserting the second interrupt request comprises asserting the second interrupt request in response to determining that the secondary interrupt line is available.

3. The method of claim 2, further comprising:
releasing the primary interrupt line in response to determining that the secondary interrupt line is not available.

4. The method of claim 1, wherein the unique delay time associated with the one of the plurality of slave nodes comprises a multiple of an address of the one of the plurality of slave nodes on the bus.

5. The method of claim 1, further comprising:
accessing a lookup table and/or software timing routine associating the one of the plurality of slave nodes with the unique delay time,
wherein asserting the second interrupt request comprises asserting the second interrupt request after the unique delay time in response accessing the lookup table and/or software timing routine.

6. The method of claim 1, wherein transmitting the message via the bus comprises:
transmitting the message via the bus in response to successfully asserting both the first and second interrupt requests.

7. The method of claim 1, wherein the primary and secondary interrupt lines electrically connect the plurality of slave nodes to the master node, and further comprising:
receiving a query from the master node via the bus in response to successfully asserting the first and second interrupt requests,
wherein transmitting the message comprises transmitting the message from the one of the plurality of slave nodes to the master node responsive to receiving the query.

8. The method of claim 7, further comprising:
monitoring, by the master node, the primary and secondary interrupt lines;
transmitting the query from the master node to the plurality of slave nodes via the bus responsive to detecting assertion of the first and second interrupt requests via the primary and secondary interrupt lines; and
receiving, at the master node, the message from the one of the plurality of slave nodes responsive to transmitting the query via the bus.

9. The method of claim 1, wherein the master node comprises a master controller in a pill dispensing system, and wherein the plurality of slave nodes comprise a plurality of controller boards associated with ones of a plurality of pill-containing bins of the pill dispensing system.

10. The method of claim 9, wherein the message from the one of the plurality of slave nodes comprises a presence message including an address thereof, a pill count successful message, a pill count failure message, pill supply error message, a pill dispensing error message, a pill agitator error message and/or a controller board processor failure message.

11. The method of claim 1, wherein the bus comprises an RS-485 network.

12. A system for bus communication without centralized arbitration, comprising:
a master node;
a plurality of slave nodes respectively associated with unique delay times for requesting an interrupt;
a bus electrically connecting the master node to the plurality of slave nodes and configured to provide communication therebetween;
a primary interrupt line electrically connecting the plurality of slave nodes; and
a secondary interrupt line electrically connecting the plurality of slave nodes,
wherein one of the plurality of slave nodes is configured to assert a first interrupt request via the primary interrupt line, assert a second interrupt request via the secondary interrupt line in response to successful assertion of the first interrupt request and after the unique delay time associated therewith, and then transmit a message to the master node via the bus.

13. The system of claim 12, wherein the one of the plurality of slave nodes is configured to determine an availability of the primary interrupt line and assert the first interrupt request in response to a determination that the primary interrupt line is available, and is further configured to determine an availability of the secondary interrupt line in response to successful assertion of the first interrupt request and at the unique delay time thereafter and assert the second interrupt request in response to a determination that the secondary interrupt line is available.

14. The system of claim 13, wherein the one of the plurality of slave nodes is configured to release the primary interrupt line responsive to a determination that the secondary interrupt line is not available.

15. The system of claim 12, wherein the unique delay time associated with the one of the plurality of slave nodes comprises a multiple of an address of the one of the plurality of slave nodes on the bus.

16. The system of claim 12, wherein the one of the plurality of slave nodes is configured to access a lookup table and/or software timing routine that associates the one of the plurality of slave nodes with the unique delay time, and is configured to assert the second interrupt request after the unique delay time in response to accessing the lookup table and/or software timing routine.

17. The system of claim 12, wherein the one of the plurality of slave nodes is configured to transmit the message via the bus responsive to successful assertion of both the first and second interrupt requests.

18. The system of claim 12, wherein the primary and secondary interrupt lines electrically connect the plurality of slave nodes to the master node, and wherein the one of the plurality of slave nodes is further configured to receive a query from the master node via the bus in response to successful assertion of the first and second interrupt requests, and is configured to transmit the message to the master node via the bus responsive to receipt of the query.

19. The system of claim 18, wherein the master node is configured to monitor the primary and secondary interrupt lines, transmit the query to the plurality of slave nodes via the bus responsive to detecting assertion of the first and second interrupt requests via the primary and secondary interrupt lines, and receive the message from the one of the plurality of slave nodes responsive to transmission of the query via the bus.

20. The system of claim 12, wherein the master node comprises a master controller in a pill dispensing system, and wherein the plurality of slave nodes comprise a plurality of controller boards associated with ones of a plurality of pill-containing bins of the pill dispensing system.

21. An automated pill dispensing system, comprising:
a plurality of bins configured to dispense pills;

a plurality of controller boards, wherein each controller board is configured to be coupled to at least one of the plurality of bins and is associated with a unique delay time for requesting an interrupt;

a master controller configured to communicate with the plurality of controller boards;

a system bus electrically connecting the master node to the plurality of controller boards and configured to provide communication therebetween;

a primary interrupt line electrically connecting the plurality of controller boards; and a secondary interrupt line electrically connecting the plurality of controller boards, wherein one of the plurality of controller boards is configured to assert a first interrupt request via the primary interrupt line, assert a second interrupt request via the secondary interrupt line in response to successful assertion of the first interrupt request and after the unique delay time associated therewith, and then transmit a message to the master controller via the system bus.

22. The system of claim 21, wherein the one of the plurality of controller boards is configured to interrogate the primary interrupt line to determine an availability thereof and assert the first interrupt request in response to a determination that the primary interrupt line is available, and is further configured to interrogate the secondary interrupt line to determine an availability thereof in response to successful assertion of the first interrupt request and at the unique delay time thereafter, and assert the second interrupt request in response to a determination that the secondary interrupt line is available.

23. The system of claim 21, wherein the unique delay time associated with the one of the plurality of controller boards comprises a multiple of an address of the one of the plurality of controller boards on the bus.

24. The system of claim 21, wherein the one of the plurality of controller boards is configured to determine the unique delay time associated therewith from a lookup table and/or software timing routine associating the one of the plurality of controller boards with the unique delay time, and is configured to assert the second interrupt request in response to accessing the lookup table and/or software timing routine.

25. A controller board for communication with a master device via a bus shared with at least one other controller board, comprising:

a microprocessor configured to assert a first interrupt request via a primary interrupt line electrically connecting the controller board to the at least one other controller board and configured to assert a second interrupt request via a secondary interrupt line electrically connecting the controller board to the at least one other controller board in response to successful assertion of the first interrupt request and after a unique delay time associated therewith for requesting an interrupt; and a bus translator coupled to the microprocessor and configured to transmit a message therefrom to the master device via the shared bus after successful assertion of both the first and second interrupt requests by the microprocessor.

\* \* \* \* \*